United States Patent
Singh et al.

(10) Patent No.: US 9,228,473 B2
(45) Date of Patent: Jan. 5, 2016

(54) SYSTEM AND METHOD OF CONTROLLING MAXIMUM HYDROCARBON INJECTION FOR DIESEL PARTICULATE FILTER REGENERATION

(75) Inventors: Navtej Singh, Lombard, IL (US); Adam C. Lack, Willow Springs, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 139 days.

(21) Appl. No.: 13/702,067

(22) PCT Filed: Jun. 4, 2010

(86) PCT No.: PCT/US2010/037365
§ 371 (c)(1),
(2), (4) Date: Mar. 18, 2013

(87) PCT Pub. No.: WO2011/152829
PCT Pub. Date: Dec. 8, 2011

(65) Prior Publication Data
US 2013/0160430 A1   Jun. 27, 2013

(51) Int. Cl.
F01N 3/00   (2006.01)
F01N 3/10   (2006.01)
F01N 3/02   (2006.01)
F01N 9/00   (2006.01)
F01N 3/025  (2006.01)
F01N 3/20   (2006.01)

(52) U.S. Cl.
CPC ............ *F01N 9/00* (2013.01); *F01N 3/0253* (2013.01); *F01N 3/2033* (2013.01); F01N 2610/03 (2013.01); F01N 2900/1402 (2013.01); Y02T 10/26 (2013.01); Y02T 10/47 (2013.01)

(58) Field of Classification Search
CPC ....... F01N 3/023; F01N 3/035; F01N 3/0253; F01N 3/2033; F01N 2610/03; F01N 2900/1402; F01N 9/00; F01N 9/002; Y02T 10/47; F02D 41/029
USPC ........... 60/274, 276, 285, 286, 295, 297, 301, 60/303, 311
See application file for complete search history.

(56) References Cited

U.S. PATENT DOCUMENTS

| | | | |
|---|---|---|---|
| 6,722,120 B2 * | 4/2004 | Plote | 60/276 |
| 6,915,629 B2 * | 7/2005 | Szymkowicz | 60/289 |
| 6,988,361 B2 * | 1/2006 | van Nieuwstadt et al. | 60/295 |
| 7,051,520 B2 * | 5/2006 | Nagaoka et al. | 60/297 |
| 7,062,907 B2 * | 6/2006 | Kitahara | 60/295 |
| 7,299,626 B2 | 11/2007 | Gundrum | |
| 2007/0044455 A1 | 3/2007 | Gundrum | |
| 2008/0022660 A1 | 1/2008 | Reuter | |

* cited by examiner

*Primary Examiner* — Jesse Bogue
*Assistant Examiner* — Diem Tran
(74) *Attorney, Agent, or Firm* — Jeffrey P. Calfa; Mark C. Bach

(57) ABSTRACT

A method of providing hydrocarbons to an engine exhaust for regenerating a diesel particulate filter within an exhaust system of a diesel engine. A mass flow rate of exhaust gas within an exhaust system is determined. A mass flow rate of oxygen within the exhaust gas entering the diesel oxidation catalyst is determined. A set point indicative of an allowable mass flow rate of oxygen within the exhaust gas exiting the diesel oxidation catalyst is received. A hydrocarbon threshold that may be injected into the exhaust system is calculated. Hydrocarbons are injected into the exhaust system upstream of the diesel oxidation catalyst, wherein the injected hydrocarbons do not exceed the calculated threshold amount of hydrocarbons.

9 Claims, 2 Drawing Sheets

SYSTEM AND METHOD OF CONTROLLING MAXIMUM HYDROCARBON INJECTION FOR DIESEL PARTICULATE FILTER REGENERATION

TECHNICAL FIELD

The present disclosure relates to regeneration of diesel particulate filters, and more particularly to a system and method for calculating a maximum amount of hydrocarbons that may be injected into the exhaust system during regeneration of a diesel particulate filter without causing unburned hydrocarbons to pass through a diesel oxidation catalyst and enter the diesel particulate filter, a condition often referred to as hydrocarbon slip.

BACKGROUND

Many factors, including environmental responsibility efforts and modern environmental regulations on engine exhaust emissions, have reduced the allowable acceptable levels of certain pollutants that enter the atmosphere following the combustion of fossil fuels. Increasingly, more stringent emission standards may require greater control over either or both the combustion of fuel and post combustion treatment of the exhaust. For example, the allowable levels of nitrogen oxides (NOx) and particulate matter have been greatly reduced over the last several years. To address, among other issues, environmental concerns, many diesel engines now have a diesel oxidation catalyst (DOC) as well as a diesel particulate filter (DPF) within an exhaust system of the diesel engine purposed to reduce the amount of NOx and particulate matter released into the atmosphere.

In some diesel engine operating conditions it may be beneficial to provide hydrocarbons, typically in the form of diesel fuel but other fuels or hydrocarbon sources may be utilized, to the exhaust system of the engine at a location upstream of the DOC such that the hydrocarbons will combust and raise temperatures within the DPF to a point sufficient to allow regeneration of the DPF. In other diesel engine operating conditions, it may be beneficial to provide hydrocarbons in the form of an in-cylinder post injection such that the exhaust is sufficiently warm to allow regeneration of the DPF to occur. However, in still other diesel engine operating conditions it may be beneficial to provide hydrocarbons both directly into the exhaust system and via in-cylinder post injection. Some engines are equipped with an injector to provide hydrocarbons both directly to the exhaust system, or via in-cylinder post injection.

However, one drawback of existing systems that provide hydrocarbons for DPF regeneration is to ensure that only a limited amount of hydrocarbons pass through the DOC without combusting, a condition often referred to as hydrocarbon slip. Hydrocarbon slip can have many negative effects on an exhaust system, such as causing the DPF to reach too high a temperature and break, causing a temperature hysteresis across the DOC, or blocking catalyst sites on the DOC and limit the DOC's ability to function properly. Therefore, a maximum amount of hydrocarbons that may be injected into the exhaust system for DPF regeneration must be controlled. Current attempts to control the maximum amount of hydrocarbon injection utilize calibration tables, but these tables were developed during steady state engine operating conditions, and therefore do not account for transient engine operating conditions.

Therefore, a need exists for a system and method of providing hydrocarbons to be used to raise exhaust temperatures that allow regeneration of a DPF to occur that allows delivery of hydrocarbons upstream of a DOC, but that calculates a maximum amount of hydrocarbons that may be delivered without causing hydrocarbon slip to exceed a preset limit.

SUMMARY

According to one process, a method of providing hydrocarbons to an engine exhaust for regenerating a diesel particulate filter within an exhaust system of a diesel engine, the diesel engine comprising an electronic control module, at least one cylinder, and at least one fuel injector in fluid communication with the at least one cylinder, and a diesel oxidation catalyst within the exhaust system is provided. A mass flow rate of exhaust gas within an exhaust system is determined. A mass flow rate of oxygen within the exhaust gas entering the diesel oxidation catalyst is determined. A set point indicative of an allowable mass flow rate of oxygen within the exhaust gas exiting the diesel oxidation catalyst is received. A hydrocarbon threshold that may be injected into the exhaust system is calculated based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst. Hydrocarbons are injected into the exhaust system upstream of the diesel oxidation catalyst, wherein the injected hydrocarbons do not exceed the calculated threshold amount of hydrocarbons.

According to one embodiment, a physical computer program product, comprises a computer usable medium having an executable computer readable program code embodied therein. The executable computer readable program code implements a method for determining a maximum amount of hydrocarbons to be provided to an engine exhaust system for regenerating a diesel particulate filter while limiting hydrocarbon slip through a diesel oxidation catalyst. The method determines a mass flow rate of exhaust gas within an exhaust system. A mass flow rate of oxygen within the exhaust gas entering the diesel oxidation catalyst is determined. A minimum allowable mass flow rate of oxygen within the exhaust gas exiting the diesel oxidation catalyst is retrieved. A maximum amount of hydrocarbons that may be injected into the exhaust system is calculated based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst to combust the hydrocarbons injected into the exhaust system.

According to another embodiment, a hydrocarbon injection system for an internal combustion engine having an exhaust system with a diesel particulate filter and a diesel oxidation catalyst, the hydrocarbon injection system comprises an electronic control module, an exhaust system, and at least one in-cylinder engine fuel injector. The electronic control module has a memory and a processor. The exhaust system has a diesel oxidation catalyst, a diesel particulate filter disposed downstream of the diesel oxidation catalyst, an exhaust flow rate sensor disposed within the exhaust system and disposed in communication with the electronic control module, an oxygen sensor disposed upstream of the diesel oxidation catalyst and in communication with the electronic control module. The at least one in-cylinder engine fuel injector is disposed within a cylinder of the engine. The fuel injector is disposed in communication with the electronic control module. The electronic control module determines a maximum amount of hydrocarbons allowable for diesel particulate filter regeneration based upon output of the oxygen sensor and the exhaust flow rate sensor.

DETAILED DESCRIPTION

Figure 1:
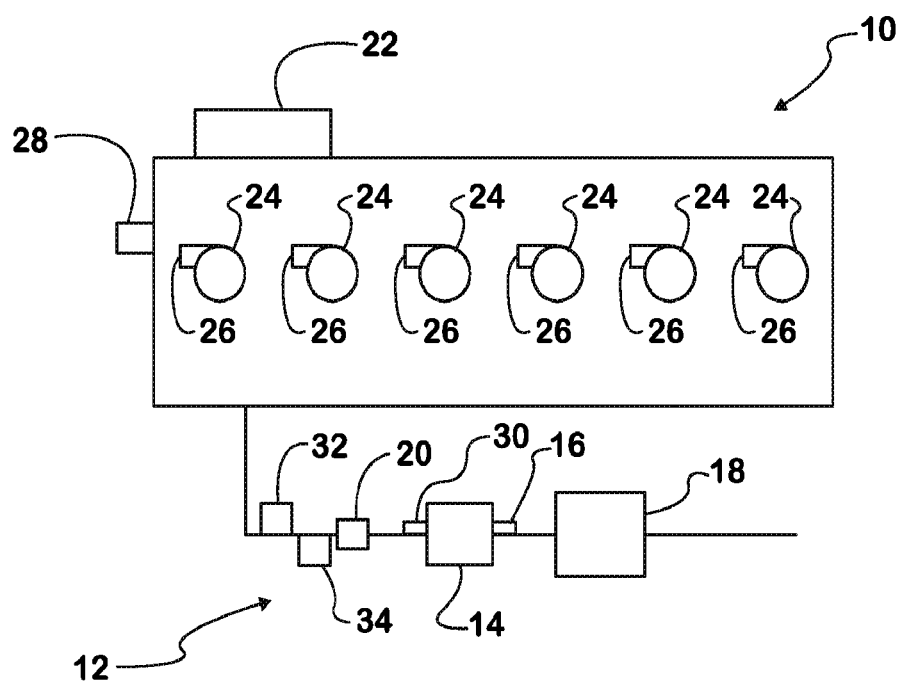
FIG. 1 is a schematic diagram showing an engine having an exhaust system with an diesel particulate filter a diesel oxidation catalyst, and a hydrocarbon injector disposed in the exhaust system.

FIG. 1 shows an engine 10 having an exhaust system 12. The exhaust system 12 comprises a diesel oxidation catalyst (DOC) 14, a DOC outlet temperature sensor 16, a diesel particulate filter (DPF) 18, and an exhaust system hydrocarbon injector 20, a DOC inlet temperature sensor 30, an exhaust flow rate sensor 32, and an exhaust oxygen sensor 34. The engine 10 additionally has an electronic control module (ECM) 22, sometimes referred to as an engine control module, or an engine control unit. The ECM 22 control operations of many aspects of the engine 10, such as fuel injection, emissions based engine settings, combustion based engine settings, and DPF regeneration, to name a few. The DOC temperature sensor 16 is in communication with the ECM 22

The engine 10 additionally has a plurality of cylinders 24, each of which has a fuel injector 26. The fuel injector 26 are capable of performing multiple injection of fuel per cylinder for each combustion cycle, such as a pre-injection, a main injection, and a post-injection, where the main injection is the fuel injection to provide the required power output of the engine 10, while the pre-injection occurs before the main injection, and the post-injection occurs after the main injection.

The engine 10 additionally has an engine speed sensor 28 that is also in communication with the ECM 22 and is used to determine the speed that the engine is running.

As shown in FIG. 1, the DOC 14 is located upstream of the DOC outlet temperature sensor 16 and the DPF 18. The exhaust system hydrocarbon injector 20 is disposed upstream of the DOC 14. The exhaust system hydrocarbon injector 20 injects hydrocarbons, such as diesel fuel, into the exhaust system 12 in order to raise the temperature of the DOC 14, as well as exhaust within the exhaust system 12. The DPF may undergo regeneration when the temperature within the exhaust system 12 is above a certain level.

The exhaust flow rate sensor 32 is disposed within the exhaust system 12 and is in communication with the ECM 22. The exhaust glow rate sensor 32 generates a signal indicative of the mass flow rate of exhaust gas within the exhaust system 12. The exhaust oxygen sensor 34 is disposed within the exhaust system 12 upstream of the DOC 14. The exhaust oxygen sensor 34 is also in communication with the ECM 22. The exhaust oxygen sensor generates a signal indicative of an amount of oxygen contained within the exhaust system 12. The amount of oxygen within the exhaust system 12 varies based on engine operating conditions, and the amount of oxygen within the exhaust system will limit the amount of hydrocarbons that may be used for DPF regeneration.

Figure 2:
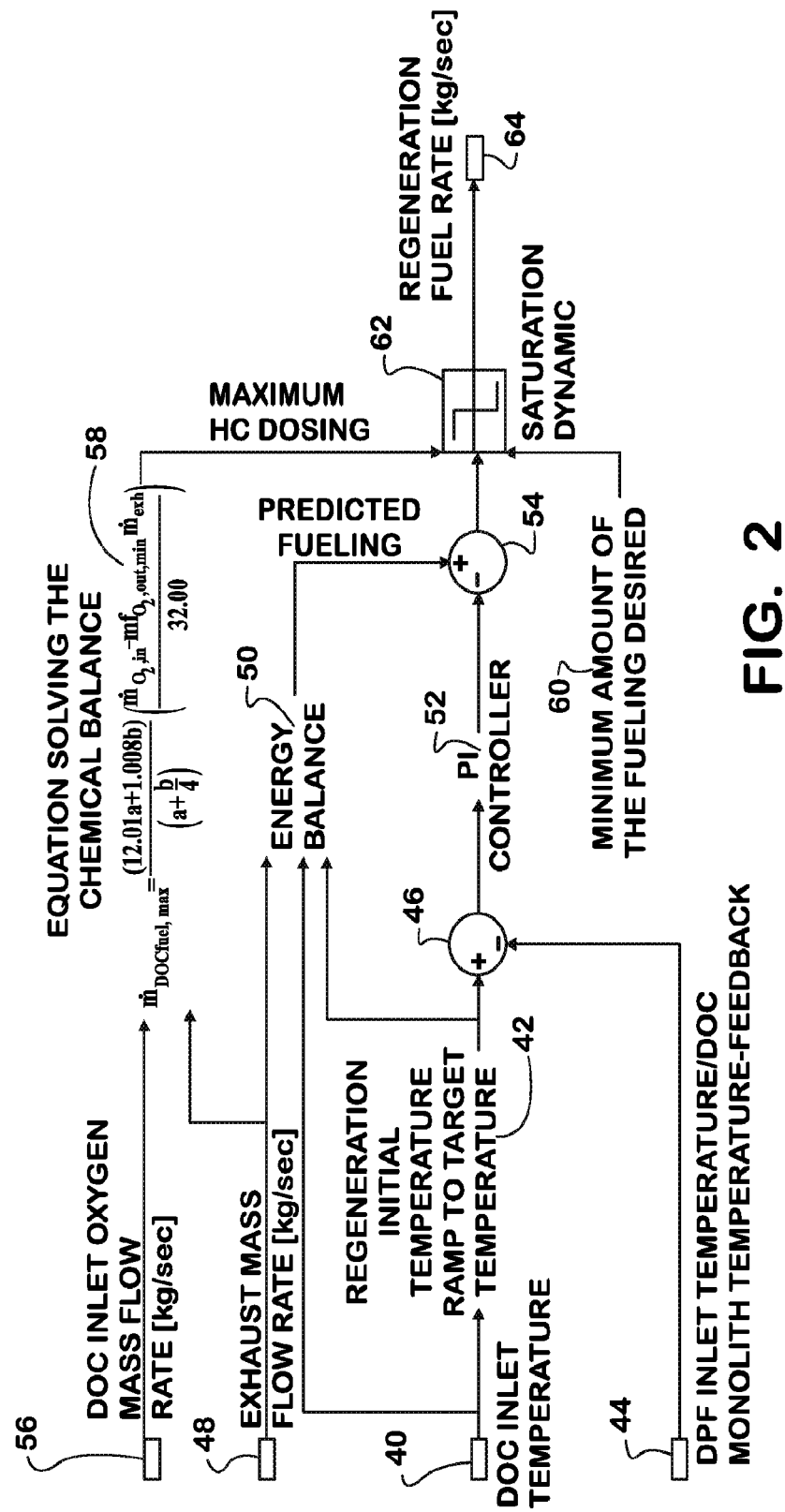
FIG. 2 is a schematic diagram showing a control system for determining an amount of hydrocarbons that may be utilized for diesel particulate filter regeneration.

Turning now to FIG. 2, a schematic diagram of a portion of an electronic control system of the engine 10 is schematically depicted. The schematic diagram of FIG. 2 would be executed within the ECM 22 of the engine 10. The control system receives a DOC inlet temperature as shown at block 40. The DOC inlet temperature is utilized to estimate a temperature change required for DPF regeneration as shown at block 42. Block 44 shows that DPF temperature may be estimated if a DOC outlet temperature sensor 16 is utilized. A comparator 46 compares the output of the estimated temperature change for DPF regeneration from block 42 with the DOC outlet temperature sensor output of block 44. The output of the comparator 46 is communicated to a post-injection controller 52. The post injection controller 52 generates an estimate of the hydrocarbons required for regeneration of the DPF.

The schematic diagram also shows that the exhaust mass flow rate is monitored at block 48 by the exhaust flow rate sensor 32 of FIG. 1. The exhaust mass flow rate determines the total amount of exhaust gas within the exhaust system. The exhaust mass flow rate is utilized in an energy balance calculation at block 50. The energy balance block 50 additionally receives input from the DOC inlet temperature block 40 and the temperature change required for DPF regeneration of block 42. The energy balance block 50 generates an estimate of hydrocarbons required for regeneration of the DPF.

FIG. 2 also depicts that oxygen mass flow rate of the exhaust system is also measured at block 56 by the exhaust oxygen sensor 34. The oxygen mass flow rate of the exhaust system of block 56 is utilized to calculate the maximum amount of hydrocarbons that may be utilized for regeneration of the DPF without causing hydrocarbon slip through the DOC as shown at block 58. The maximum amount of hydrocarbons that may be utilized for regeneration of the DPF without causing hydrocarbon slip through the DOC is based in part on a predetermined minimum acceptable oxygen mass fraction at the outlet of the DOC. It has been found that in many instances the minimum oxygen mass fraction should be at or above 0.04. The basic chemical balance equation is:

$$xC_aH_b + yO_2 \rightarrow pH_2O + qCO_2 + rO_2$$

Where, a and b are the number of carbon and hydrogen atoms in the hydrocarbon, respectively (user specified in calibration). The coefficient x, y, p, q and r are coefficients to balance the chemical equation. Thus balancing the coefficient will give following relation Carbon C: q=xa, Hydrogen H: 2h=xb, Oxygen O: p+2q+2r=2y. Solving for x yields $$x = \frac{y-r}{a + \frac{b}{4}}.$$

From the above equation, x, y, and r may be defined as molar flow rates as follows:

$$x = \dot{n}_{DOCfuel,max} = \frac{\dot{m}_{DOCfuel,max}}{MW_{fuel}} = \frac{\dot{m}_{DOCfuel,max}}{12.01a + 1.008b}$$

$$y = \dot{n}_{O_2,in} = \frac{\dot{m}_{O_2,in}}{MW_{O_2}} = \frac{\dot{m}_{O_2,in}}{32.00}$$

$$r = \dot{n}_{O_2,out} = \frac{\dot{m}_{O_2,out}}{MW_{O_2}} = \frac{\dot{m}_{O_2,out}}{32.00}$$

Where, $\dot{n}_{DOCfuel,max}$=Maximum rate that fuel can be injected ahead of the DOC [kmol/s]

$\dot{n}_{O_2,in}$=Oxygen flow rate in the exhaust entering the DOC [kmol/s]

$\dot{n}_{O_2,out}$=Oxygen flow rate in the exhaust exiting the DOC/ entering the DPF) [kmol/s]

$\dot{m}_{DOCfuel,max}$=Maximum rate that fuel can be injected ahead of the DOC [kg/s]

$\dot{m}_{O_2,in}$=Oxygen flow rate in the exhaust entering the DOC [kg/s]

$\dot{m}_{O_2,out}$=Oxygen flow rate in the exhaust exiting the DOC/ entering the DPF) [kg/s]

$MW_{fuel}$=Molecular weight of the fuel [kg/kmol]

$MW_{O_2}$=Molecular weight of oxygen [kg/kmol]

In order to calculate the maximum rate of hydrocarbons that may be injected ahead of the DOC is based in part on the oxygen mass fraction required at the DPF inlet as specified by a predetermined threshold and is converted to converted into mass flow rate $m_{O_2,out}$ using the following relation:

$$\dot{m}_{O_2,out} = mf_{O_2,out,min}\dot{m}_{exh}$$

where, $mf_{O_2,out,min}$=Minimum acceptable mass fraction of oxygen at the DOC outlet/DPF inlet $\dot{m}_{exh}$=Mass flow rate of exhaust gas flowing into the DOC [kg/s]

Utilizing the above equations, the maximum mass flow rate of fuel may be calculated according to the formula:

$$\dot{m}_{DOCfuel,max} = \frac{(12.01a + 1.008b)}{\left(a + \frac{b}{4}\right)} \left(\frac{\dot{m}_{O_2,in} - mf_{O_2,out,min}\dot{m}_{exh}}{32.00}\right).$$

Thus, utilizing the exhaust flow rate sensor 32 and the exhaust oxygen sensor 34 as well as known properties of the hydrocarbon utilized for DPF regeneration, the maximum amount of hydrocarbons that may be injected into the exhaust system without causing hydrocarbon slip through the DPF is calculated. The above formula may also be easily utilized during transient engine operating conditions when the flow rate of the exhaust is changing and the amount of oxygen within the exhaust may also be changing over time.

The output of the maximum amount of hydrocarbons that may be injected into the exhaust without causing hydrocarbon slip through the DOC of block 58 is fed into a saturation dynamic lock 62. The saturation dynamic block 62 additionally receives input from comparator 54 and the and a minimum amount of fueling required block 60. The saturation dynamic block 62 ensures that the amount of hydrocarbons injected into the exhaust system will not exceed the maximum amount of hydrocarbons that may be injected into the exhaust without causing hydrocarbon slip through the DOC. The regeneration hydrocarbon injection rate is then set at block 64 to ensure that DPF regeneration It will be understood that a control system may be implemented in hardware to effectuate the method. The control system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the control system is implemented in software, it should be noted that the control system can be stored on any computer readable medium for use by or in connection with any computer related system or method. In the context of this document, a "computer-readable medium" can be any medium that can store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical) and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A method of providing hydrocarbons to an engine exhaust for regenerating a diesel particulate filter within an exhaust system of a diesel engine, the diesel engine comprising an electronic control module, at least one cylinder, and a diesel oxidation catalyst within the exhaust system, the method comprising:
    determining a mass flow rate of exhaust gas within an exhaust system;
    determining a mass flow rate of oxygen within the exhaust gas entering the diesel oxidation catalyst;
    determining a minimum mass flow rate of oxygen within the exhaust gas exiting the diesel oxidation catalyst;
    receiving a set point indicative of an allowable mass flow rate of oxygen within the exhaust gas exiting the diesel oxidation catalyst;
    calculating a hydrocarbon threshold for injecting into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst;
    calculating an amount of hydrocarbons required to raise a temperature of the diesel particulate filter to a pre-set temperature for regeneration;
    comparing the amount of hydrocarbons required to raise the temperature of the diesel particulate filter to the hydrocarbon threshold determined to be injected into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst;
    injecting an amount of hydrocarbons equal to the lesser of the amount of hydrocarbons required to raise a temperature of the diesel particulate filter to a pre-set temperature for regeneration and a maximum amount of hydrocarbons determined to be injected into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst.

2. The method of claim 1, wherein the hydrocarbon threshold determined to be injected into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst varies based upon the hydrocarbon utilized.

3. The method of claim 1, wherein the hydrocarbon threshold determined to be injected into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst is calculated during transient engine operating conditions.

4. The method of claim 1, wherein the hydrocarbon threshold determined to be injected into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst is calculated according to the formula:

$$\dot{m}_{DOCfuel,max} = \frac{(12.01a + 1.008b)}{\left(a + \frac{b}{4}\right)} \left( \frac{\dot{m}_{O_2,in} - mf_{O_2,out,min} \dot{m}_{exh}}{32.00} \right)$$

wherein a corresponds to the number of carbon atoms in the hydrocarbon and b corresponds to the number of hydrogen atoms in the hydrocarbon.

5. A method for preventing over-injection of hydrocarbons, the method comprising, a non-transitory computer usable medium having an executable computer readable program code embodied therein, the executable computer readable program code for implementing a method for determining a maximum amount of hydrocarbons to be provided to an engine exhaust system for regenerating a diesel particulate filter while limiting hydrocarbon slip through a diesel oxidation catalyst, the method comprising:
    determining a mass flow rate of exhaust gas within an exhaust system;
    determining a mass flow rate of oxygen within the exhaust gas entering the diesel oxidation catalyst;
    retrieving a minimum allowable mass flow rate of oxygen within the exhaust gas exiting the diesel oxidation catalyst;
    varying the minimum allowable mass flow rate of oxygen within the exhaust gas exiting the diesel oxidation catalyst based on the hydrocarbon;
    calculating a maximum amount of hydrocarbons to be injected into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst to combust the hydrocarbons injected into the exhaust system, and injecting an amount of hydrocarbons less than the maximum amount of hydrocarbons calculated to be injected into the exhaust system.

6. The method of claim 5, wherein the hydrocarbon is diesel fuel.

7. The method of claim 5, wherein the maximum amount of hydrocarbons to be injected into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst is calculated during transient engine operating conditions.

8. The method of claim 5, wherein the maximum amount of hydrocarbons to be injected into the exhaust system based upon the mass flow rate of exhaust gas within the exhaust system, the mass flow rate of oxygen within the exhaust gas entering the diesel oxidation catalyst, and the minimum mass flow rate of oxygen within the exhaust gas exiting the diesel oxidation catalyst is calculated according to the formula:

$$\dot{m}_{DOCfuel,max} = \frac{(12.01a + 1.008b)}{\left(a + \frac{b}{4}\right)} \left( \frac{\dot{m}_{O_2,in} - mf_{O_2,out,min} \dot{m}_{exh}}{32.00} \right)$$

wherein a corresponds to the number of carbon atoms in the hydrocarbon and b corresponds to the number of hydrogen atoms in the hydrocarbon.

9. The method of claim 8, wherein $mf_{O_2}$, out, min is stored in the electronic control module.

* * * * *